(12) United States Patent
Yager

(10) Patent No.: US 9,263,196 B2
(45) Date of Patent: Feb. 16, 2016

(54) CHEMICAL VAPOR DEPOSITION GRAPHENE FOAM ELECTRODES FOR PSEUDO-CAPACITORS

(75) Inventor: Thomas A. Yager, Encinitas, CA (US)

(73) Assignee: Empire Technology Development LLC, Wilmington, DE (US)

( * ) Notice: Subject to any disclaimer, the term of this patent is extended or adjusted under 35 U.S.C. 154(b) by 380 days.

(21) Appl. No.: 13/519,569

(22) PCT Filed: Apr. 20, 2011

(86) PCT No.: PCT/US2011/033162
§ 371 (c)(1),
(2), (4) Date: Jun. 27, 2012

(87) PCT Pub. No.: WO2012/144993
PCT Pub. Date: Oct. 26, 2012

(65) Prior Publication Data
US 2013/0021718 A1    Jan. 24, 2013

(51) Int. Cl.
*H01G 9/00*    (2006.01)
*H01G 11/36*   (2013.01)
(Continued)

(52) U.S. Cl.
CPC .............. *H01G 11/36* (2013.01); *B82Y 30/00* (2013.01); *B82Y 40/00* (2013.01); *C01B 31/0453* (2013.01); *H01G 11/24* (2013.01); *H01G 11/46* (2013.01); *H01G 11/86* (2013.01); *C01P 2004/30* (2013.01); *C01P 2006/12* (2013.01); *Y02E 60/13* (2013.01)

(58) Field of Classification Search
USPC .................................. 29/25.03; 361/502, 503
See application file for complete search history.

(56) References Cited

U.S. PATENT DOCUMENTS

| 6,660,224 B2 | 12/2003 | Lefebvre et al. |
| 2010/0176767 A1* | 7/2010 | Long et al. .................... 320/137 |

(Continued)

FOREIGN PATENT DOCUMENTS

WO    2011019431 A1    2/2011

OTHER PUBLICATIONS

Chen et al., Electrophoretic deposition of graphene nanosheets on nickel foams for electrochemical capacitors, Nov. 2009, Journal of Power Sources, 195 (2010), 3031-3035.*

(Continued)

*Primary Examiner* — Eric Thomas
(74) *Attorney, Agent, or Firm* — Turk IP Law, LLC

(57) ABSTRACT

Technologies are generally described for a porous graphene electrode material is described herein that may incorporate a three-dimensional open-cell graphene structure fabricated via chemical vapor deposition onto a metal foam. After the graphene is deposited, the metal foam may be dissolved, leaving a three-dimensional open-cell graphene structure that may include single or few layer graphene. Pseudo-capacitive materials, such as $RuO_2$, $Fe_3O_4$, or $MnO_2$, may be deposited within the pores of the three-dimensional open-cell graphene structure to form the porous graphene electrode material. The porous graphene electrode material may have a specific capacitance comparable to chemically modified graphene (CMG) electrodes. The porous graphene electrode material may also have a conductivity greater than CMG electrodes of equivalent surface area. Use of the porous graphene electrode material in capacitors may result in significant improvements in specific power compared to CMG based capacitors.

24 Claims, 7 Drawing Sheets

(51) Int. Cl.
    H01G 11/24    (2013.01)
    H01G 11/46    (2013.01)
    H01G 11/86    (2013.01)
    C01B 31/04    (2006.01)
    B82Y 30/00    (2011.01)
    B82Y 40/00    (2011.01)

(56) References Cited

U.S. PATENT DOCUMENTS

2011/0038100 A1*  2/2011  Lu et al. ............ 361/502
2012/0087061 A1*  4/2012  Thompson et al. ....... 361/502

OTHER PUBLICATIONS

Wu et al., Anchoring Hydrous RuO2 on Graphene Sheets for High-Performance Electrochemical Capacitors, 2010, Adv. Funct. Mater., 20, 3595-3602.*

Zhu et al., Graphene and Graphene Oxide: Synthesis, Properties, and Applications, Advanced Materials. 2010, XX, 1-19.

American Elements: Nickel Foam Supplier & Tech, Info; 3 pages published online Apr. 20, 2011 http://www.americanelements.com/nifoam.html.

Kim et al., Large-scale pattern growth of graphene films for stretchable transparent electrodes—*Nature* 457, 706-710 (Feb. 5, 2009).

Fischer et al., Incorporation of Homogeneous Nanoscale MnO2 with Ultraporous Carbon Structures via Self-Limiting Electroless Deposition: Implications for Electrochemical Capacitors, Surface Chemistry Branch (Code 6170) and Materials and Sensors Branch (Code 6360), Naval Research Laboratory, Washington, DC 20375 *Nano Lett.*, 2007, 7 (2), pp. 281-286.

Yan et al., Fast and reversible surface redox reaction of graphene—$MnO_2$ composites as supercapacitor electrodes—*CARBON* 48 (2010) 3825-3833.

Simon et al., Materials for electrochemical capacitors—*Nature Materials*, vol. 7 Nov. 2008 pp. 845-854.

Wu et al., "High-Energy $MnO_2$ Nanowire/Graphene and Graphene Asymmetric Electrochemical Capacitors", Nano 2010, 4(10): 5835.

Chen et al., "Graphene Oxide/MnO2 Nanocomposites for Supercapacitors", Nano 2010, 4(5): 2822.

Qian et al., "Synthesis of manganese dioxide/reduced graphene oxide composites with excellent electrocatalytic activity toward reduction of oxygen", Materials Letters 2011; 65: 56-58.

Miller et al., "Graphene Double-Layer Capacitor with ac Line-Filtering Performance", Science 2010, 329: 1637.

Kajdos et al., "Ion Diffusion in EDLC Based on Microporous Carbons", School of Materials Science and Engineering, Georgia Institute of Technology, Atlanta, GA, USA, 2Materials Science Center, University of Wisconsin—Madison, Madison, WI, Micromeritics Instrument Corp, Norcross, GA USA. 1 pg.

Reddy et al., Multisegmented Au-MnO2/Carbon Nanotube Hybrid Coaxial, Arrays for High-Power Supercapacitor Applications, J. Phys. Chem. C, 2010,114 (1), pp. 658-663.

Kim et al., Highly dispersed ruthenium oxide nanoparticles on carboxylated carbon nanotubes for supercapacitor electrode materials, Journal of Materials Chemistry, Received on Aug. 22, 2005, Accepted Sep. 20, 2005 First published as an Advance Article on the web Oct. 5, 2005.

Chen, Z. et al., 'Three Dimensional Flexible and Conductive Interconnected Graphene Networks Grown by Chemical Vapour Deposition', Nature Materials, 2011, vol. 10, pp. 424-428, (published online Apr. 10, 2011).

International Search Report and Written Opinion PCT/US2011/033162, international filing date Apr. 20, 2011, mailed May 11, 2011.

International Preliminary Report on Patentability, PCT/US11/33162, issued Oct. 22, 2013.

* cited by examiner

CHEMICAL VAPOR DEPOSITION GRAPHENE FOAM ELECTRODES FOR PSEUDO-CAPACITORS

This Application is the National Stage filing under 35 U.S.C. §371 of PCT Application Ser. No. PCT/US11/33162 filed on Apr. 20, 2011. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Chemically Modified Graphene (CMG) electrodes are employed in Electrical Double Layer Capacitors (EDLCs) and hybrid EDLCs (Faradaic Capacitors) with specific capacitance reported as high as 216 Farads per gram, in part due to the reported specific surface area for graphene of 2630 square meters per gram. These electrodes include highly porous Chemically Modified Graphene (CMG), fabricated, for example, from graphene oxide flakes followed by reduction to form graphene.

The present disclosure appreciates that there are limitations with known CMG electrodes. For example, in sheet form the electrical conductivity of CMG may be less than other forms of graphene, reportedly ten times than graphene formed by chemical vapor deposition. Lower electrical conductivity may lead to a lower specific power and energy loss for a corresponding capacitor due to internal resistance. The present disclosure appreciates that preparing porous graphene electrodes with desirable levels of conductivity and surface area, particularly for use in EDLCs and hybrid EDLCs, may be a complex undertaking.

SUMMARY

The following summary is illustrative only and is not intended to be in any way limiting. In addition to the illustrative aspects, embodiments, and features described below, further aspects, embodiments, and features will become apparent by reference to the drawings and the following detailed description.

According to some examples, the present disclosure describes a graphene-based electronic apparatus with a first electrode that includes a three-dimensional open-cell graphene structure, formed by chemical vapor deposition on a metal foam substrate.

According to other examples, the present disclosure describes a method of making a graphene-based electronic apparatus. The method includes forming a first electrode by depositing graphene via chemical vapor deposition on an open-cell metal foam substrate.

According to further examples, the present disclosure describes a system for manufacturing a graphene-based capacitor device. The system may include one or more of a chemical vapor depositor, a chamber configured for metal dissolution, an electroless depositor, a capacitor forming machine, and a controller. The controller may be coupled to the chemical vapor depositor, the chamber, the electroless depositor, and the capacitor forming machine, and be programmable to deposit graphene via chemical vapor deposition on an open-cell metal foam substrate, dissolve the open-cell metal foam substrate to leave an open-cell graphene structure, and deposit a layer of pseudo-capacitive material in the open-cell graphene structure to form a first electrode.

According to yet other examples, the present disclosure describes a capacitor with a first electrode that contacts a first surface of a separator and includes a three-dimensional open-cell graphene structure, formed by chemical vapor deposition on a metal foam substrate. The capacitor may also include a second electrode that contacts a second surface of the separator and includes another three-dimensional open-cell graphene structure, formed by chemical vapor deposition on another metal foam substrate.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
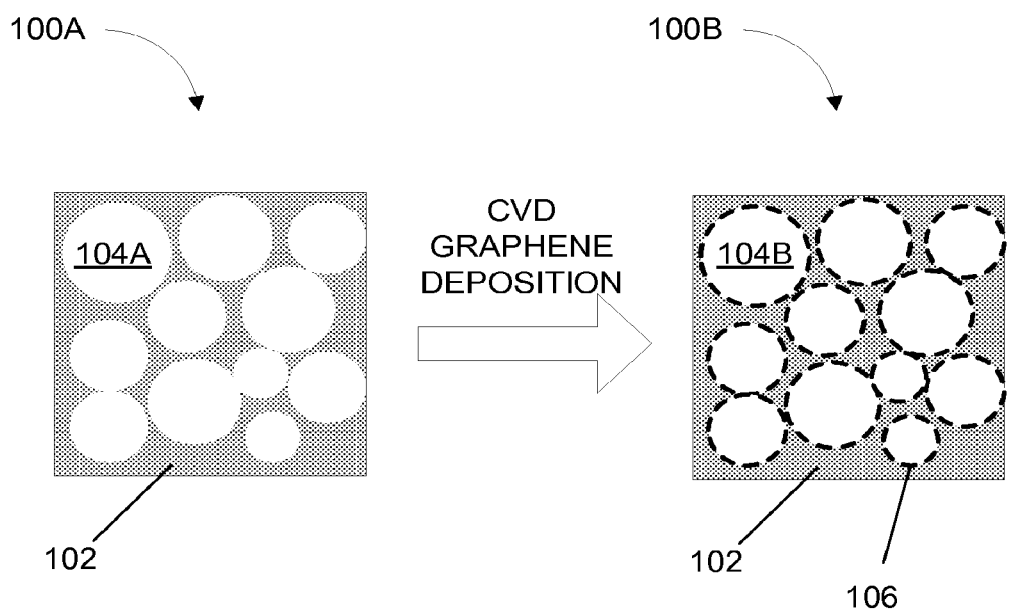
FIG. 1 is a conceptual drawing showing chemical vapor deposition of graphene in an open-cell metal foam substrate to form an example open-cell foam graphene-metal composite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to compositions, methods, apparatus, systems, devices, and/or computer program products related to manufacturing or using a porous graphene electrode material formed by chemical vapor deposition on a metal foam. For example, such porous graphene electrode materials may be used as part of an energy storage device such as a capacitor.

Briefly stated, a porous graphene electrode material is described herein that may incorporate a three-dimensional open-cell graphene structure fabricated via chemical vapor deposition onto a metal foam. The metal foam may include any metal suitable for preparation of graphene. After the graphene is deposited, the metal foam may be dissolved, leaving a three-dimensional open-cell graphene structure with a single or few layers of graphene. Pseudo-capacitive materials, such as $RuO_2$, $Fe_3O_4$, or $MnO_2$, may be deposited within the pores of the three-dimensional open-cell graphene structure to form the porous graphene electrode material. The porous graphene electrode material may have a specific capacitance comparable to chemically modified graphene (CMG) electrodes. The porous graphene electrode material may also have a conductivity greater than CMG electrodes of similar surface area.

FIG. 1 is a conceptual drawing showing chemical vapor deposition of graphene in an open-cell metal foam substrate to form an example open-cell foam graphene-metal composite arranged in accordance with at least some embodiments as described herein. The term "open-cell" refers to a structure formed by a plurality of cells where inside surfaces of individual cells are accessible from neighboring cells in contrast to a closed-cell structure where individual cells may be self-contained (e.g., a bubble structure). FIG. 1 depicts open-cell metal foam structure 100A, which includes a metal foam 102 formed with foam void spaces 104A. Graphene layer 106 may be deposited by a chemical vapor deposition process on metal foam 102 to form example open-cell foam graphene-metal composite 100B. For example, graphene layer 106 may be deposited on the inner surfaces of metal foam 102 in metal foam void spaces 104A, resulting in graphene foam void spaces 104B.

The chemical vapor deposition (CVD) process depicted in FIG. 1 may use any suitable materials and conditions for forming graphene by chemical vapor deposition. For example, the chemical vapor deposition process depicted in FIG. 1 may be conducted by flowing a gas mixture of $CH_4$:$H_2$:Ar=50:65:200 sccm (standard cubic centimeters per minute) through metal foam 102 at about at 1000° C. The gas mixture may be flowed until graphene 106 has been deposited onto metal foam 102, e.g., in foam void spaces 104A to form graphene void spaces 104B. The graphene-metal foam composite 100B may be cooled, for example to room temperature at a rate of about 10° C. per second in flowing argon. Embodiments are not limited to the above listed materials (e.g., gas mixtures) or temperatures, however.

Metal foam 102 may include any metal suitable for preparation of graphene. Graphene may be grown on any suitable metal foam using chemical vapor deposition. One suitable example metal may be nickel, for the following reasons. First, nickel has a melting point of about 1455° C., compared to an example chemical vapor deposition temperature of about 1000° C. Having such a temperature difference may reduce the possibility of sintering of the metal foam 102 during the chemical vapor deposition process. Second, nickel surfaces may produce graphene with more than one layer. Additional layers may provide sacrificial carbon for other deposition processes which may use carbon. For example, this document also describes a carbon-consuming deposition of a pseudo-capacitive material on the graphene. The sacrificial carbon provided by additional layers of graphene may allow the graphene structure to be maintained in view of such other carbon-consuming deposition processes.

Metal foams that include suitable metals may be produced in many different shapes and forms. Open-cell metal foams may be available, for example, with surface areas exceeding 20,000 square meters per cubic meter, and void volume percentages ranging from about 75% to about 95%.

Figure 2:
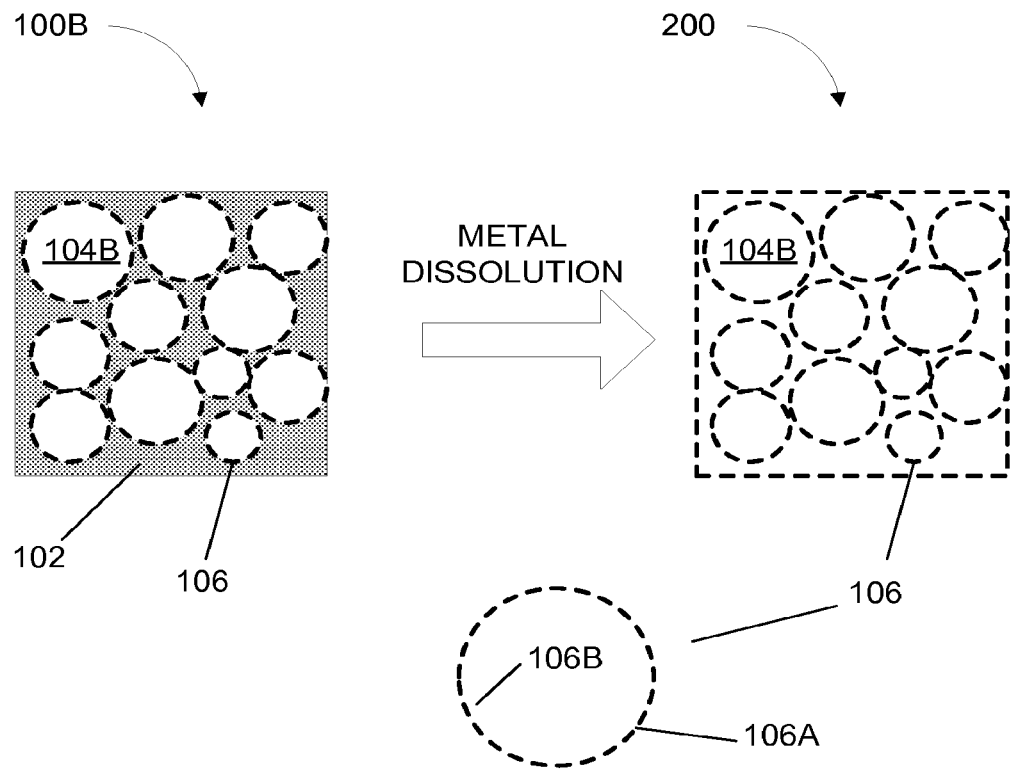
FIG. 2 is a conceptual drawing showing dissolution of an open-cell metal foam substrate to leave an example open-cell graphene structure.

FIG. 2 is a conceptual drawing showing dissolution of an open-cell metal foam substrate to leave an example open-cell graphene structure, arranged in accordance with at least some embodiments as described herein. As depicted in FIG. 2, open-cell foam graphene-metal composite 1008 may be subjected to a metal dissolution process, which removes metal foam 102, leaving an example open-cell graphene structure 200. The graphene 106 in open-cell graphene structure 200 may include various surfaces, for example, graphene surfaces 106A and 106B. Graphene surface 1068 includes portions of graphene 106 that may border graphene void spaces 104B. Graphene surface 106A includes portions of graphene 106 that may have previously contacted metal foam 102, prior to the dissolution of metal foam 102. Although a 2-D cross-section, as in FIG. 2, appears as if the graphene surfaces are isolated, they are highly interconnected in 3-D enabling high electrical conductivity.

The metal dissolution process depicted in FIG. 2 may use any suitable material and conditions for dissolving metal foam 102 in the presence of graphene 106. For example, when metal foam 102 is a suitable metal such as nickel, metal foam 102 may be dissolved using an aqueous etching solution of iron nitrate or ferric chloride. Because open-cell graphene structure 200 may include open-cells or pores 104B, a flow solution may facilitate the metal dissolution process depicted in FIG. 2. The metal dissolution process depicted in FIG. 2 may be facilitated by, for example, mechanical agitation, heating, and/or sonication. The metal dissolution process depicted in FIG. 2 may also be facilitated by applying a positive potential to the metal foam 102 and placing one or more negative electrodes in the etching solution.

Figure 3:
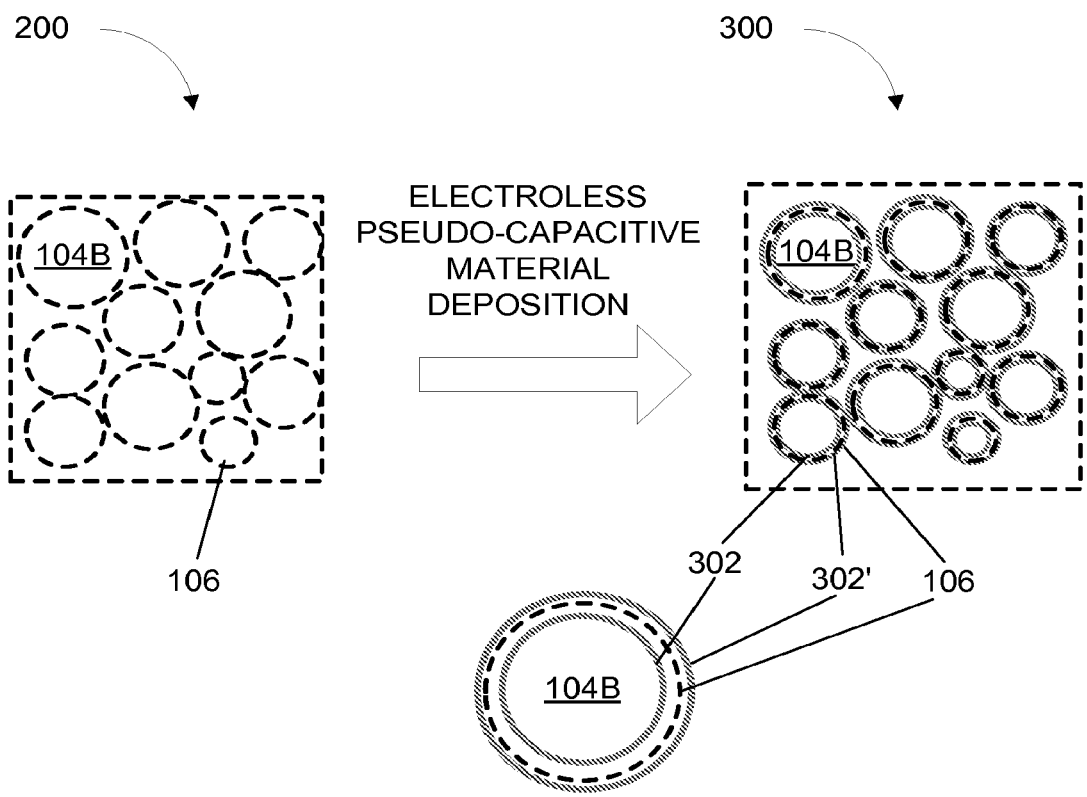
FIG. 3 is a conceptual drawing showing electroless deposition of a thin pseudo-capacitive material layer in an open-cell graphene foam to form an example open-cell foam graphene pseudo-capacitive material composite.

FIG. 3 is a conceptual drawing showing electroless deposition of a thin pseudo-capacitive material layer in an open-cell graphene foam to form an example open-cell foam graphene pseudo-capacitive material composite arranged in accordance with at least some embodiments as described herein. In FIG. 3, a thin pseudo-capacitive material layer 302 and another thin pseudo-capacitive material layer 302' are deposited in open-cell graphene structure 200 to form an example open-cell foam graphene pseudo-capacitive material composite 300. For example, thin pseudo-capacitive material layer 302 and the other thin pseudo-capacitive material layer 302' may be deposited at graphene 106. The thin pseudo-capacitive material layer 302 and the other thin pseudo-capacitive material layer 302' may be deposited at any surface of graphene 106, e.g., graphene surfaces 106A and/or 106B. The surface area of graphene 106 that may be contacted by thin pseudo-capacitive material layer 302 or the other thin pseudo-capacitive material layer 302' and may be greater than the surface area of the metal foam 102 used in FIG. 1, since graphene surfaces 106A and 106B may both include a layer of thin pseudo-capacitive material layer 302.

The electroless deposition process depicted in FIG. 3 may use any suitable material and conditions for depositing thin pseudo-capacitive material layer 302 at graphene 106. Suitable pseudo-capacitive materials, such as $RuO_2$, $Fe_3O_4$ or $MnO_2$, may be used to increase capacitance substantially. As an example, $MnO_2$ may be used due to its cost, energy density, and chemical stability. Suitable ultrathin $MnO_2$ layers (tens to hundreds of nanometers thick) may produce specific capacitances ranging from about 700 Farads per gram to about 1380 Farads per gram. An exemplary electroless deposition process may be self-limiting and may be used to produce a uniform ultrathin coating on graphene 106 according to the following reaction.

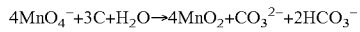
$$4MnO_4^- + 3C + H_2O \rightarrow 4MnO_2 + CO_3^{2-} + 2HCO_3^-$$

Figure 4:
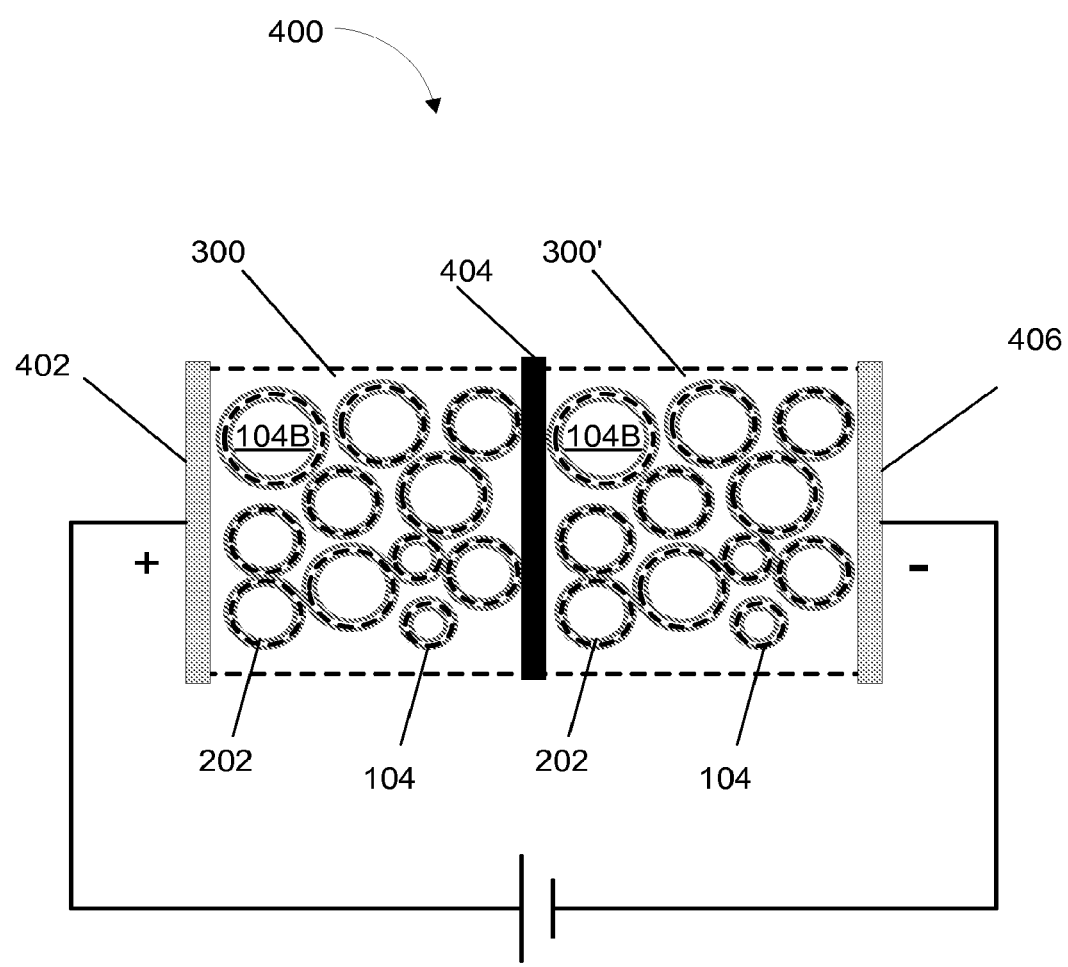
FIG. 4 is a conceptual drawing showing a cross section of an example capacitor using two electrodes, wherein each electrode includes an example open-cell foam graphene pseudo-capacitive material composite.

FIG. 4 is a conceptual drawing showing a cross section of an example capacitor using two electrodes, where each electrode includes an example open-cell foam graphene pseudo-capacitive material composite arranged in accordance with at least some embodiments as described herein. FIG. 4 depicts an example capacitor 400, using two electrodes 402 and 406. A thin pseudo-capacitive material layer 202 is deposited in an open-cell graphene structure to form an open-cell foam graphene pseudo-capacitive material composite 300 and 300'. In examples, a graphene layer 104 may be deposited by a chemical vapor deposition process on metal foam to form the example open-cell foam graphene-metal composite 300 and 300'. Electrodes 402 and 406 each include the example open-cell foam graphene pseudo-capacitive material composite 300 and 300', respectively. The example open-cell foam graphene pseudo-capacitive material composites 300 and 300' may be divided by a separator 404. Thus, as depicted in FIG. 4, example capacitor 400 is an electrochemical double layer capacitor. The polarity depicted for electrodes 402 and 406 is shown for convenience of illustration, and may be configured for opposite polarity.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
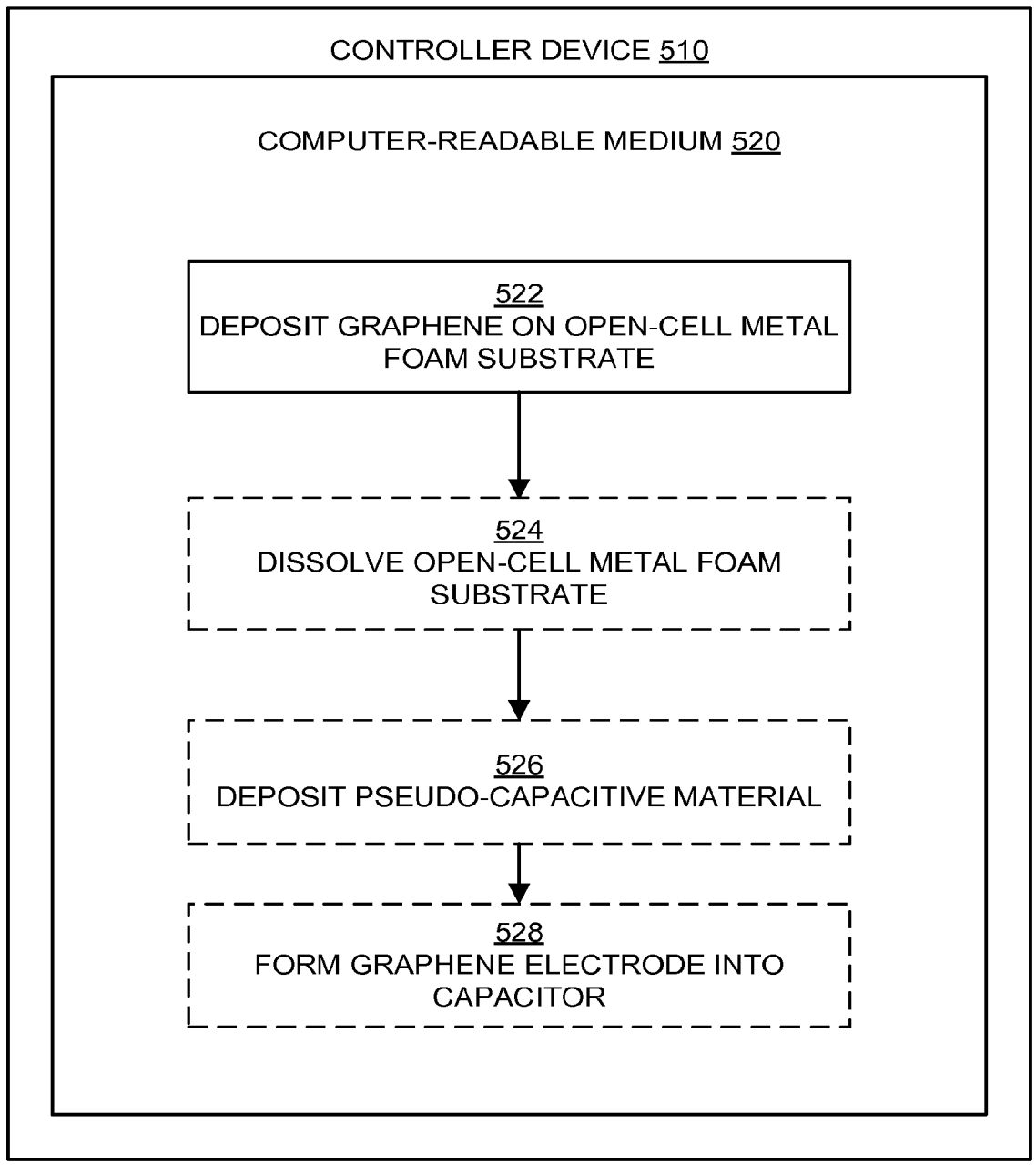
FIG. 5 is a flow diagram showing steps that may be used in making an example open-cell graphene foam as disclosed herein.

FIG. 5 is a flow diagram showing steps that may be used in making an example open-cell graphene structure as disclosed herein arranged in accordance with at least some embodiments as described herein. In various examples, the flow diagram in FIG. 5 shows steps that may be used in a method of making an example open-cell foam graphene-metal composite 1008, and/or an example open-cell graphene structure 200, and/or an example open-cell foam graphene pseudo-capacitive material composite 300, and/or an example capacitor 400.

Figure 6:
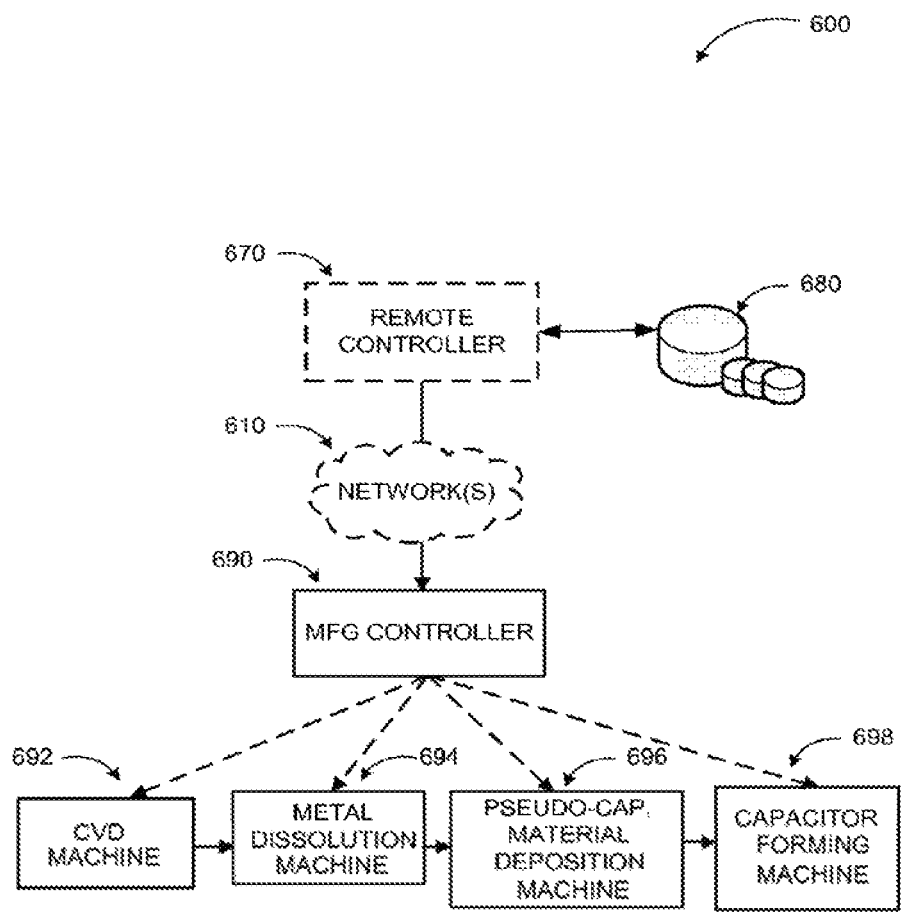
FIG. 6 is a block diagram of an automated machine that may be used for making an example open-cell graphene foam using the process steps outlined in FIG. 5.
Figure 7:
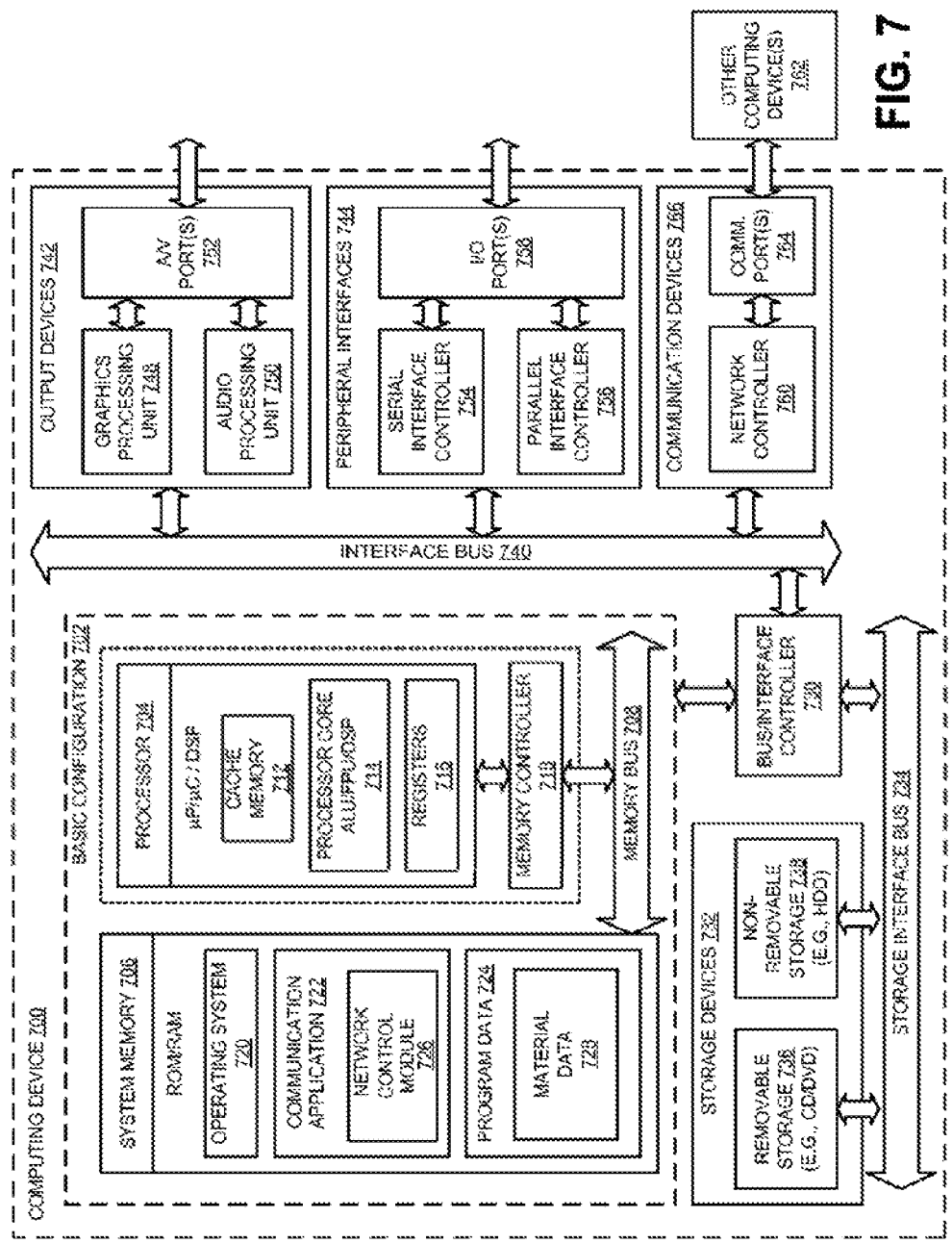
FIG. 7 illustrates a general purpose computing device that may be used to control the automated machine of FIG. 6 or similar manufacturing equipment in making an example open-cell graphene foam as disclosed herein, all arranged in accordance with at least some embodiments as described herein.

In particular, FIG. 5 illustrates an example method of making an example open-cell foam graphene-metal composite 1008, and/or an example open-cell graphene structure 200, and/or an example open-cell foam graphene pseudo-capacitive material composite 300, and/or an example capacitor 400 that may be performed by a computing device such as device 700 in FIG. 7 or a special purpose controller such as manufacturing controller 690 of FIG. 6. Thus, controller device 510 may be embodied as computing device 700, manufacturing controller 690, or similar devices executing instructions stored in computer-readable medium 520 for performing the method. A process of making an example open-cell foam graphene-metal composite 100B, and/or an example open-cell graphene structure 200, and/or an example open-cell foam graphene pseudo-capacitive material composite 300, and/or an example capacitor 400 may include one or more operations, functions or actions as is illustrated by one or more of blocks 522, 524, 526, and/or 528.

Some example processes may begin with operation 522, "DEPOSIT GRAPHENE ON OPEN-CELL METAL FOAM SUBSTRATE". Operation 522 may be performed, for example, by chemical vapor deposition machine 692 of FIG. 6. At operation 522, a received signal may indicate, for example, the extent of deposition, for example by elapsed time. Operation 522 may be continued until a desired point is reached, e.g., the layer of graphene 106 on metal foam 102 is as thick as desired.

Operation 522 may use any suitable materials and conditions for forming graphene by chemical vapor deposition. Operation 522 may control the deposition process depicted in FIG. 1. For example, the chemical vapor deposition process depicted in FIG. 1 may be conducted by flowing a gas mixture of $CH_4$:$H_2$:Ar through metal foam 102.

The total flow rate of the gas mixture of $CH_4$:$H_2$:Ar of the chemical vapor deposition process depicted in FIG. 1 may be from about 50 sccm (standard cubic centimeters per minute) to about 350 sccm. In some examples, the total flow rate of the gas mixture of $CH_4$:$H_2$:Ar may be from about 100 sccm to about 350 sccm, about 50 sccm to about 300 sccm, about 100 sccm to about 300 sccm, about 150 sccm to about 250 sccm, or about 200 sccm.

The temperature of the chemical vapor deposition process depicted in FIG. 1 may be from about 900° C. to about 1100° C. In some examples, the temperature of the chemical vapor deposition process depicted in FIG. 1 may be from about 900° C. to about 1100° C., from about 925° C. to about 1100° C., from about 900° C. to about 1075° C., from about 950° C. to about 1050° C., from about 975° C. to about 1025° C., or about 1000° C.

The gas mixture of $CH_4$:$H_2$:Ar of the chemical vapor deposition process depicted in FIG. 1 may include a molar ratio of $CH_4$:$H_2$ from about 0.5:1 to about 3:1. In some examples, the gas mixture of $CH_4$:$H_2$:Ar may include a molar ratio of $CH_4$:$H_2$ from about 0.5:1 to about 2.5:1, about 0.5:1 to about 2:1, about 0.5:1 to about 1.5:1, about 0.5:1 to about 1:1, about 0.6:1 to about 1:1, about 0.7:1 to about 0.8:1, or about 0.77:1. The gas mixture of $CH_4$:$H_2$:Ar may include Ar as a percentage of the total gas mixture from about 0% to about 70%, the exact amount which may be adjusted according to the characteristics of the chamber employed for the chemical vapor deposition and the characteristics of a particular metal foam 102 being used.

The gas mixture may be flowed until graphene 106 has been deposited onto metal foam 102, e.g., in foam void spaces 104A to form graphene void spaces 104B. The graphene-metal foam composite 100B may be cooled at any suitable rate, e.g., in flowing argon, for example to room temperature at a rate of about 5° C. per second to about 20° C. per second, or in some examples about 10° C. per second.

Operation 522 may be followed by operation 524, "DISSOLVE OPEN-CELL METAL FOAM SUBSTRATE". Operation 524 may use any suitable materials and conditions for dissolving metal foam 102 in the presence of graphene 106. Operation 524 may be employed to conduct the dissolution process depicted in FIG. 2. For example, at operation 524, the processor (e.g. processor 704) may control a dissolution apparatus such as machine 694 of FIG. 6 to contact metal foam 102 with an etching solution. For example, when metal foam 102 is a suitable metal such as nickel, metal foam 102 may be dissolved using an aqueous etching solution of iron nitrate or ferric chloride. Because open-cell graphene structure 200 may include open-cells or pores 104B, steps which flow solution may facilitate the metal dissolution process depicted in FIG. 2. The metal dissolution process depicted in FIG. 2 may be facilitated by, for example, mechanical agitation, heating, and/or sonication. The metal dissolution process depicted in FIG. 2 may also be facilitated by applying a positive potential to the metal foam 102 and placing a negative electrode in the etching solution. Thus, a dissolution apparatus such as machine 694 of FIG. 6 may also include a mechanical agitator, a heater, a sonicator, and/or an electrical power supply for supplying a positive potential to the metal foam 102 and a negative potential to the etching solution.

Operation 524 may be followed by operation 526, "DEPOSIT PSEUDO-CAPACITIVE MATERIAL." Operation 526 may use any suitable materials and conditions for depositing thin pseudo-capacitive material layer 302 at graphene 106. Operation 526 may be employed to conduct the thin pseudo-capacitive material layer deposition process depicted in FIG. 3. For example, at operation 526, the processor (e.g. processor 704) may control a solution phase electroless pseudo-capacitive material deposition apparatus such as machine 696 of FIG. 6 to contact open-cell graphene structure 200 with an electroless pseudo-capacitive material deposition solution. For example, suitable pseudo-capacitive materials, such as $RuO_2$, $Fe_3O_4$ or $MnO_2$, may be used to significantly increase capacitance. As an example, $MnO_2$ may be used due to its practical cost, energy density, and chemical stability. Suitable ultrathin $MnO_2$ layers (tens to hundreds of nanometers thick) may produce specific capacitances ranging from 700 Farads per gram to 1380 Farads per gram. A suitable electroless $MnO_2$ process has been used for deposition deposited on nanofoams and graphene flakes for capacitor applications. This exemplary electroless deposition process may be self-limiting and may be used to produce a uniform ultrathin coating on graphene 106 according to the following reaction.

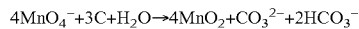

$$4MnO_4^- + 3C + H_2O \rightarrow 4MnO_2 + CO_3^{2-} + 2HCO_3^-$$

Accordingly, a solution phase electroless pseudo-capacitive material deposition apparatus such as machine 696 of FIG. 6 may contact open-cell graphene structure 200 with a solution $MnO_4^-$ ion, which reacts with carbon in open-cell graphene structure 200 and water in the solution. The result is deposition of a thin pseudo-capacitive material layer 302 at graphene 106, e.g., as $MnO_2$; carbonate and bicarbonate ion byproducts remain in the solution and may be washed away.

Operation 526 may be followed by operation 528, "FORM GRAPHENE ELECTRODE INTO CAPACITOR." Operation 528 may use any suitable materials and conditions for forming a capacitor from example open-cell foam graphene pseudo-capacitive material composite 300. Operation 528 may be employed to manufacture a capacitor such as the example capacitor depicted in FIG. 4. For example, at operation 526, the processor (e.g. processor 704) may control capacitor forming machine 698 of FIG. 6 to contact two electrodes 402 and 406, respectively, to example open-cell foam graphene pseudo-capacitive material composite 300 and 300'. Also at operation 526, the processor (e.g. processor 704) may control capacitor forming machine 698 of FIG. 6 to contact example open-cell foam graphene pseudo-capacitive material composite 300 and 300' to a separator 404. Also at operation 526, the processor (e.g. processor 704) may control capacitor forming machine 698 of FIG. 6 to encase example capacitor 400 in a suitable casing.

The operations included in the process of FIG. 5 described above are for illustration purposes. A process of making an example open-cell foam graphene-metal composite 1008, and/or an example open-cell graphene structure 200, and/or an example open-cell foam graphene pseudo-capacitive material composite 300, and/or an example capacitor 400 may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

FIG. 6 is a block diagram of an automated machine 600 that may be used for making an example open-cell foam graphene-metal composite 1008, and/or an example open-cell graphene structure 200, and/or an example open-cell foam graphene pseudo-capacitive material composite 300, and/or an example capacitor 400, using the process steps outlined in FIG. 5, in accordance with at least some embodiments described herein. As illustrated in FIG. 6, a manufacturing controller 690 is coupled to machines that can be used to carry out the steps described in FIG. 5, for example, a chemical vapor deposition machine 692, a metal dissolution machine 694, a pseudo-capacitive material deposition machine 696, and/or a capacitor forming machine 698. Manufacturing controller 690 may be operated by human control, or may be directed by a remote controller 670 coupled to a data center 680 via network 610.

FIG. 7 illustrates a general purpose computing device that may be used to control the automated machine 600 of FIG. 6 or similar manufacturing equipment in making an example dielectric material 10, in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a cache memory 712, a processor core 714, and registers 716. Example processor core 714 may include an arithmetic logic unit (ALU), a floating point unit (FPU), a digital signal processing core (DSP Core), or any combination thereof. An example memory controller 718 may also be used with processor 704, or in some implementations memory controller 715 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more communication applications 722, and program data 724. In examples, the program data 724 may include material data 728. Communication application 722 may include a network control module 726 that is arranged to control automated machine 600 of FIG. 6 and any other processes, methods and functions as discussed above. The output of the automated machine 600 may include the material data 728. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 766) to basic configuration 702 via bus/interface controller 730. Example output devices 742 include a graphics processing unit 748 and an audio processing unit 750, which may be configured to communicate to various external devices such as a display or speakers via one or more NV ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 766 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a physical server, virtual server, a computing cloud, or a hybrid device that include any of the above functions. Computing device 700 may also be implemented as a personal computer including both laptop computer and non-laptop computer configurations. Moreover computing device 700 may be implemented as a networked system or as part of a general purpose or specialized server.

Networks for a networked system including computing device 700 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

According to some examples, the present disclosure describes a graphene-based electronic apparatus with a first electrode that includes a three-dimensional open-cell graphene structure, formed by chemical vapor deposition on a metal foam substrate.

According to other examples, the metal foam substrate may be dissolved after the three-dimensional open-cell graphene structure is formed. The first electrode may further include a layer of pseudo-capacitive material in contact with the open-cell graphene structure. The pseudo-capacitive material may include one or more of $RuO_2$, $Fe_3O_4$ and/or $MnO_2$. The open-cell graphene structure may be characterized by a void volume of between about 75% and about 95%, and/or by a surface area of at least about 2500 meters per gram.

According to further examples, the first electrode may further include the metal foam substrate, which may include one or more of nickel, copper, ruthenium, iron, cobalt and/or platinum. The open-cell graphene structure may include cell walls that average between one and ten layers of graphene. The apparatus may also include a separator having a first side in contact with the first electrode and a second electrode in contact with a second side of the separator, where the graphene-based electronic apparatus is configured to operate as a capacitor device. The second electrode may include a three-dimensional open-cell graphene structure, formed by chemical vapor deposition on a metal foam substrate, and the graphene-based electronic apparatus may be configured to operate as an electric double layer capacitor device. The apparatus may be characterized by a specific capacitance of at least about 400 Farads per gram.

According to other examples, the present disclosure describes a method of making a graphene-based electronic apparatus. The method includes forming a first electrode by depositing graphene via chemical vapor deposition on an open-cell metal foam substrate. The method may also include dissolving the open-cell metal foam substrate to leave an open-cell graphene structure, where the open-cell metal foam substrate may be dissolved with a solution including one or more of iron nitrate and/or ferric chloride.

According to some examples, the open-cell metal foam substrate may be dissolved using one or more of mechanical agitation, an electric potential, heating, and/or sonication. The method may also include depositing a layer of pseudo-capacitive material in the open-cell graphene structure of the first electrode, where the layer of pseudo-capacitive material includes one or more of $RuO_2$, $Fe_3O_4$ and/or $MnO_2$. The layer of pseudo-capacitive material may be deposited by an electroless process.

According to further examples, the open-cell graphene structure may be characterized by a void volume of between about 75% and about 95%. Alternatively, the open-cell graphene structure may be characterized by a surface area of at least about 2500 meters per gram. The open-cell graphene structure may include cell walls that average between one and ten layers of graphene.

According to yet other examples, the method may include forming the first electrode by contacting the open-cell graphene structure to a first electrical lead, contacting the first electrode to a first side of a separator, and contacting a second electrode to a second side of the separator, where the graphene-based electronic apparatus is configured to operate as a capacitor device. The second electrode may include a three-dimensional open-cell graphene structure, formed by chemical vapor deposition on a metal foam substrate, where the graphene-based electronic apparatus is configured to operate as an electric double layer capacitor device.

According to further examples, the present disclosure describes a system for manufacturing a graphene-based capacitor device. The system may include one or more of a chemical vapor depositor, a chamber configured for metal dissolution, an electroless depositor, a capacitor forming machine, and a controller. The controller may be coupled to the chemical vapor depositor, the chamber, the electroless depositor, and the capacitor forming machine, and be programmable to deposit graphene via chemical vapor deposition on an open-cell metal foam substrate, dissolve the open-cell metal foam substrate to leave an open-cell graphene structure, and deposit a layer of pseudo-capacitive material in the open-cell graphene structure to form a first electrode.

According to some examples, the controller may further be programmable to deposit graphene via chemical vapor deposition on an open-cell metal foam substrate; dissolve the open-cell metal foam substrate to leave an open-cell graphene structure; deposit a layer of pseudo-capacitive material in the open-cell graphene structure to form a second electrode; contact the first electrode to a first side of a separator; and contact the second electrode with a second side of the separator. The second electrode may include a three-dimensional open-cell graphene structure, formed by chemical vapor deposition on a metal foam substrate, and where the graphene-based capacitor device is configured to operate as an electric double layer capacitor device.

According to yet other examples, the present disclosure describes a capacitor with a first electrode that contacts a first surface of a separator and includes a three-dimensional open-cell graphene structure, formed by chemical vapor deposition on a metal foam substrate. The capacitor may also include a second electrode that contacts a second surface of the separator and includes another three-dimensional open-cell graphene structure, formed by chemical vapor deposition on another metal foam substrate.

According to further examples, the first and second electrodes may each further include a layer of pseudo-capacitive material in contact with the open-cell graphene structure. The pseudo-capacitive material may include one or more of $RuO_2$, $Fe_3O_4$ and/or $MnO_2$. The open-cell graphene structure may be characterized by a void volume of between about 75% and about 95%, and/or by a surface area of at least about 2500 meters per gram. The capacitor may be characterized by a specific capacitance of at least about 400 Farads per gram.

The terms "a" and "an" as used herein mean "one or more" unless the singular is expressly specified. Thus, for example, reference to "a base" includes a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

The terms "optional" and "optionally" mean that the subsequently described circumstance may or may not occur, so that the description includes instances where the circumstance occurs and instances where it does not.

As used herein, a metal suitable for preparation of graphene includes any element whose atom has an incomplete d sub-shell, or which can give rise to cations with an incomplete d sub-shell, e.g., any D-block element, a lanthanide, or an actinide. Example metals which may be suitable include, for example, scandium, titanium, vanadium, chromium, manganese, iron, cobalt, nickel, ruthenium, platinum, or copper. In some examples, suitable metals for preparation of graphene include nickel, copper, ruthenium, iron, cobalt, or platinum. In various examples, metal foam 102 includes nickel.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-cells refers to groups having 1, 2, 3, 4, or cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A graphene-based electronic apparatus, comprising:
    a first electrode that includes:
        a metal foam substrate; and
        a three-dimensional open-cell graphene structure, formed by chemical vapor deposition on the metal foam substrate,
            wherein the metal foam substrate includes one from a set of: copper, ruthenium, cobalt, and platinum, and
            wherein the chemical vapor deposition uses a gas mixture of $CH_4$:$H_2$:Ar having a molar ratio of $CH_4$:$H_2$ from about 0.5:1 to about 3:1, and
        wherein the gas mixture of $CH_4$:$H_2$:Ar includes Ar in about 0% to about 70% of a total volume of the gas mixture; and
    a layer of pseudo-capacitive material in contact with the three-dimensional open-cell graphene structure, wherein a surface area of the three-dimensional open-cell graphene structure is greater than a surface area of the metal foam substrate.

2. The graphene-based electronic apparatus of claim 1, wherein the layer of the pseudo-capacitive material includes one or more of $RuO_2$, $Fe_3O_4$ and $MnO_2$.

3. The graphene-based electronic apparatus of claim 1, wherein the three-dimensional open-cell graphene structure is characterized by a void volume of between about 75% and about 95%.

4. The graphene-based electronic apparatus of claim 1, wherein the three-dimensional open-cell graphene structure is characterized by the surface area of at least about 2500 meters per gram.

5. The graphene-based electronic apparatus of claim 1, wherein the three-dimensional open-cell graphene structure includes cell walls that average between one and ten layers of graphene.

6. The graphene-based electronic apparatus of claim 1, further comprising:
    a separator having a first side in contact with the first electrode; and
    a second electrode in contact with a second side of the separator, wherein the graphene-based electronic apparatus is configured to operate as a capacitor device.

7. The graphene-based electronic apparatus of claim 6, wherein the second electrode includes another three-dimensional open-cell graphene structure, formed by chemical vapor deposition on a metal foam substrate, and wherein the graphene-based electronic apparatus is configured to operate as an electric double layer capacitor device.

8. The graphene-based electronic apparatus of claim 6, characterized by a specific capacitance of at least about 400 Farads per gram.

9. A method to make a graphene-based electronic apparatus, comprising:
    forming a first electrode by depositing a three-dimensional open-cell graphene structure via chemical vapor deposition on an open-cell metal foam substrate,
        wherein the chemical vapor deposition uses a gas mixture of $CH_4$:$H_2$:Ar having a molar ratio of $CH_4$:$H_2$ from about 0.5:1 to about 3:1, and wherein the gas mixture of $CH_4$:$H_2$:Ar includes Ar in about 0% to about 70% of a total volume of the gas mixture,
        wherein the first electrode includes the open-cell metal foam substrate, and
        wherein the open-cell metal foam substrate includes one from a set of: copper, ruthenium, cobalt, and platinum; and
    depositing a layer of pseudo-capacitive material in the three-dimensional open-cell graphene structure of the first electrode, wherein a surface area of the three-dimensional open-cell graphene structure is greater than a surface area of the metal foam substrate.

10. The method of claim 9, wherein the layer of pseudo-capacitive material includes one or more of $RuO_2$, $Fe_3O_4$ and $MnO_2$.

11. The method of claim 9, wherein the layer of pseudo-capacitive material is deposited by an electroless process.

12. The method of claim 9, wherein the three-dimensional open-cell graphene structure is characterized by a void volume of between about 75% and about 95%.

13. The method of claim 9, wherein the three-dimensional open-cell graphene structure is characterized by the surface area of at least about 2500 meters per gram.

14. The method of claim 9, wherein the three-dimensional open-cell graphene structure includes cell walls that average between one and ten layers of graphene.

15. The method of claim 9, further comprising:
    forming the first electrode by contacting the three-dimensional open-cell graphene structure to a first electrical lead;
    contacting the first electrode to a first side of a separator; and
    contacting a second electrode to a second side of the separator, wherein the graphene-based electronic apparatus is configured to operate as a capacitor device.

16. The method of claim 15, wherein the second electrode includes another three-dimensional open-cell graphene structure, formed by chemical vapor deposition on a metal foam substrate, and wherein the graphene-based electronic apparatus is configured to operate as an electric double layer capacitor device.

17. A system to manufacture a graphene-based capacitor device, comprising:
    a chemical vapor depositor;
    an electroless depositor;
    a capacitor forming machine; and
    a controller coupled to the chemical vapor depositor, the electroless depositor, and the capacitor forming machine, wherein the controller is configured to:
        deposit graphene via chemical vapor deposition on an open-cell metal foam substrate,
            wherein the chemical vapor deposition uses a gas mixture of $CH_4$:$H_2$:Ar having a molar ratio of $CH_4$:$H_2$ from about 0.5:1 to about 3:1, and wherein the gas mixture of $CH_4:H_2:Ar$ includes Ar in about 0% to about 70% of a total volume of the gas mixture, and wherein the open-cell metal foam substrate includes one from a set of: copper, ruthenium, cobalt, and platinum; and deposit a first layer of pseudo-capacitive material in a three-dimensional open-cell graphene structure to form a first electrode, wherein the first electrode includes the open-cell metal foam substrate, and wherein a surface area of the three-dimensional open-cell graphene structure is greater than a surface area of the metal foam substrate.

18. The system of claim 17, wherein the controller is further configured to:

deposit graphene via chemical vapor deposition on the open-cell metal foam substrate;

deposit a second layer of the pseudo-capacitive material in another three-dimensional open-cell graphene structure to form a second electrode;

contact the first electrode to a first side of a separator; and contact the second electrode with a second side of the separator.

19. The system of claim 18, wherein the second electrode includes the other three-dimensional open-cell graphene structure, formed by chemical vapor deposition on the open-cell metal foam substrate, and wherein the graphene-based capacitor device is configured to operate as an electric double layer capacitor device.

20. A capacitor, comprising:

a first electrode including a metal foam substrate contacts a first surface of a separator and includes a three-dimensional open-cell graphene structure, formed by chemical vapor deposition on the metal foam substrate, wherein the chemical vapor deposition uses a gas mixture of $CH_4:H_2:Ar$ having a molar ratio of $CH_4:H_2$ from about 0.5:1 to about 3:1, and wherein the gas mixture of $CH_4:H_2:Ar$ includes Ar in about 0% to about 70% of a total volume of the gas mixture, wherein the metal foam substrate includes one from a set of: copper, ruthenium, cobalt, and platinum, and wherein a surface area of the three-dimensional open-cell graphene structure is greater than a surface area of the metal foam substrate;

a first layer of pseudo-capacitive material in contact with the three-dimensional open-cell graphene structure;

a second electrode that contacts a second surface of the separator and includes another three-dimensional open-cell graphene structure, formed by chemical vapor deposition on another metal foam substrate, wherein the chemical vapor deposition uses a gas mixture of $CH_4:H_2:Ar$ having a molar ratio of $CH_4:H_2$ from about 0.5:1 to about 3:1, and wherein the gas mixture of $CH_4:H_2:Ar$ includes Ar in about 0% to about 70% of a total volume of the gas mixture; and a second layer of the pseudo-capacitive material in contact with the other open-cell graphene structure, wherein the surface area of the other three-dimensional open-cell graphene structure is greater than the surface area of the other metal foam substrate.

21. The capacitor of claim 20, wherein the first layer of the pseudo-capacitive material includes one or more of $RuO_2$, $Fe_3O_4$ and $MnO_2$.

22. The capacitor of claim 20, wherein the three-dimensional open-cell graphene structure is characterized by a void volume of between about 75% and about 95%.

23. The capacitor of claim 20, wherein the three-dimensional open-cell graphene structure is characterized by the surface area of at least about 2500 meters per gram.

24. The capacitor of claim 20, characterized by a specific capacitance of at least about 400 Farads per gram.

* * * * *